(12) United States Patent
Garot et al.

(10) Patent No.: US 12,366,411 B2
(45) Date of Patent: Jul. 22, 2025

(54) REFRACTORY ANCHOR

(71) Applicant: Silicon Refractory Anchoring Systems B.V., Wateringen (NL)

(72) Inventors: Danielle Francesca Garot, Wateringen (NL); Jerome Michael Garot, Wateringen (NL)

(73) Assignee: SILICON HOLDING B.V. (NL)

( * ) Notice: Subject to any disclaimer, the term of this patent is extended or adjusted under 35 U.S.C. 154(b) by 804 days.

(21) Appl. No.: 17/605,357

(22) PCT Filed: Apr. 20, 2020

(86) PCT No.: PCT/EP2020/060992
§ 371 (c)(1),
(2) Date: Oct. 21, 2021

(87) PCT Pub. No.: WO2020/216714
PCT Pub. Date: Oct. 29, 2020

(65) Prior Publication Data
US 2022/0205720 A1  Jun. 30, 2022

(30) Foreign Application Priority Data
Apr. 26, 2019  (NL) .................................. 2023011

(51) Int. Cl.
*F27D 1/14*  (2006.01)
*B23K 9/20*  (2006.01)

(52) U.S. Cl.
CPC ................ *F27D 1/141* (2013.01); *B23K 9/20* (2013.01); *B23K 9/201* (2013.01)

(58) Field of Classification Search
CPC ............ F27D 1/141; B23K 9/20; B23K 9/201
(Continued)

(56) References Cited

U.S. PATENT DOCUMENTS 1,942,863 A * 1/1934 Johnstone ............... F27D 1/141
52/704
1,945,925 A * 2/1934 Stiefel ................... E04B 1/2608
403/2

(Continued)

FOREIGN PATENT DOCUMENTS

| CN | 201016563   | * | 2/2008 | |
|----|-------------|---|--------|---|
| CN | 201016563 Y |   | 2/2008 | |
| FR | 3064207 A1  | * | 9/2018 | .............. B01J 19/02 |

OTHER PUBLICATIONS

FR 3064207 Machine Translation (Year: 2024).*
International Search Report (ISR) and Written Opinion (WO) for PCT/EP2020/060992 mailed May 28, 2020 1 (9 pages).

*Primary Examiner* — James M Ference
(74) *Attorney, Agent, or Firm* — Jonathan M. Hines; Shumaker, Loop & Kendrick, LLP

(57) ABSTRACT

A refractory anchor comprising an elongated mounting pin having a first end and a second end opposite to the first end seen in the longitudinal direction of the elongated mounting pin, wherein the first end of the elongated mounting pin is weldable to an object, the refractory anchor further comprises two anchor fins of which each has a first anchor fin section having a first side and an opposing second side located at a distance of the elongated mounting pin with respect to the first side, wherein the first side is connected to the elongated mounting pin.

22 Claims, 4 Drawing Sheets

(58) Field of Classification Search
USPC .......................................................... 52/698
See application file for complete search history.

(56) References Cited

U.S. PATENT DOCUMENTS

| | | | | |
|---|---|---|---|---|
| 1,962,906 | A * | 6/1934 | Mueller | E04H 12/28 52/564 |
| 1,974,279 | A * | 9/1934 | Jones | B29D 99/0057 428/116 |
| 2,178,782 | A * | 11/1939 | Dunlap | F27D 1/141 52/703 |
| 2,348,314 | A * | 5/1944 | Spalding | F27D 1/004 52/778 |
| 2,413,425 | A * | 12/1946 | Anderson | F27D 1/141 52/379 |
| 2,618,961 | A * | 11/1952 | Williamson | F27D 1/004 432/252 |
| 4,479,337 | A * | 10/1984 | Crowley | F27D 1/10 52/378 |
| 4,581,867 | A * | 4/1986 | Crowley | F27D 1/141 52/378 |
| 4,651,487 | A * | 3/1987 | Nishikawa | F27D 1/141 52/378 |
| 4,660,343 | A * | 4/1987 | Raycher | F16L 59/12 52/378 |
| 4,680,908 | A * | 7/1987 | Crowley | F23M 5/04 52/378 |
| 4,711,186 | A * | 12/1987 | Chen | B01J 19/0053 52/378 |
| 4,753,053 | A * | 6/1988 | Heard | E04F 13/0837 110/336 |
| 4,852,324 | A * | 8/1989 | Page | F27D 1/145 52/378 |
| 4,897,977 | A * | 2/1990 | Page | F27D 1/141 52/855 |
| D375,892 | S * | 11/1996 | Kraemer, Jr. | D8/384 |
| D393,588 | S * | 4/1998 | Tuthill | D8/384 |
| 6,393,789 | B1 * | 5/2002 | Lanclos | F27D 1/141 52/378 |
| 8,944,042 | B2 * | 2/2015 | Imle | F23M 5/085 52/98 |
| 9,127,890 | B2 | 9/2015 | Garot | |
| 9,279,245 | B2 * | 3/2016 | Garot | E04B 1/4121 |
| 10,048,006 | B2 * | 8/2018 | Decker | C10G 75/00 |
| 10,352,619 | B2 * | 7/2019 | Yoder | B01J 19/0053 |
| 10,508,861 | B1 * | 12/2019 | D'Oracio De Almeida | G01J 3/26 |
| D872,569 | S * | 1/2020 | D'Oracio De Almeida | D8/384 |
| 10,982,903 | B2 | 4/2021 | D'Oracio De Almeida et al. | |
| 11,428,007 | B2 * | 8/2022 | Garot | B23K 9/207 |
| 11,428,470 | B2 | 8/2022 | D'Oracio De Almeida et al. | |
| 11,486,643 | B1 * | 11/2022 | Garot | F27D 1/142 |
| 11,499,780 | B2 * | 11/2022 | Garot | B23K 9/20 |
| 11,692,775 | B2 * | 7/2023 | Garot | F27D 1/16 52/699 |
| 12,018,712 | B2 * | 6/2024 | Garot | F16B 37/061 |
| 2015/0013264 | A1 * | 1/2015 | Garot | E04B 1/4121 52/699 |
| 2015/0147236 | A1 * | 5/2015 | Simon | B32B 15/043 422/310 |
| 2015/0267122 | A1 * | 9/2015 | Hinson | C10B 39/06 422/241 |
| 2016/0047124 | A1 * | 2/2016 | Garot | B23K 9/207 29/525.13 |
| 2017/0321962 | A1 * | 11/2017 | Decker | F27D 1/1684 |
| 2018/0320973 | A1 * | 11/2018 | Yoder | B01J 19/0053 |
| 2018/0345401 | A1 * | 12/2018 | Giaramita | F27D 1/141 |
| 2020/0078762 | A1 * | 3/2020 | Lesage | B01J 8/1872 |
| 2020/0340510 | A1 * | 10/2020 | Garot | F27D 1/141 |
| 2020/0340511 | A1 * | 10/2020 | Garot | F27D 1/141 |
| 2022/0205720 | A1 * | 6/2022 | Garot | F27D 1/141 |
| 2022/0205721 | A1 * | 6/2022 | Garot | B23K 1/0008 |

* cited by examiner

REFRACTORY ANCHOR

TECHNICAL FIELD AND BACKGROUND

The invention relates to a refractory anchor comprising an elongated mounting pin having a first end and a second end opposite to the first end seen in the longitudinal direction of the elongated mounting pin, wherein the first end of the elongated mounting pin is weldable to an object, the refractory anchor further comprises two anchor fins of which each has a first anchor fin section having a first side and an opposing second side located at a distance of the elongated mounting pin with respect to the first side, wherein the first side is connected to the elongated mounting pin.

The invention further relates to an assembly comprising an object and a refractory anchor and to a method for providing an assembly.

US 2016/0047124 discloses a refractory anchor which is for example shown in FIG. 1, which comprises an anchoring nut fixated to a mounting pin, wherein the anchoring nut comprises three spaced anchor fins extending radially outwardly from the anchoring nut. The mounting pin is weldable to a metal object. The known refractory anchors provide excellent liner anchoring results. For providing a relatively strong anchoring hexagonal shape by means of the known refractory anchors at least three refractory anchors have to be mounted to a metal object before the lining material in liquid form can be applied.

SUMMARY

It is an object of the present invention to provide an improved refractory anchor. This object is achieved by the refractory anchor as defined in claim 1.

The refractory anchor comprises an elongated mounting pin having a first end and a second end opposite to the first end seen in the longitudinal direction of the elongated mounting pin, wherein the first end of the elongated mounting pin is weldable to an object. The refractory anchor further comprises two anchor fins of which each has a first anchor fin section having a first side and an opposing second side located at a distance of the elongated mounting pin with respect to the first side, wherein the first side is connected to the elongated mounting pin. The two first anchor fin sections are located in one virtual plane, and a second anchor fin section is connected to the second side of each first anchor fin section. Seen from above the refractory anchor, each second anchor fin section branches off in a V-shaped manner from each first anchor fin section, wherein two V-shaped anchor fin branches of at least one second anchor fin section have substantially the same height seen in the longitudinal direction of the elongated mounting pin.

This configuration with two first anchor fin sections located in in one virtual plane provides a relatively strong refractory anchor and a basis for the second anchor fin sections to provide a refractory anchor having two Y-shapes on opposing sides to the elongated mounting pin. By means of this arrangement of the refractory anchor mimicking two half-hexagonal shapes as a result of the two Y-shaped anchor fins on opposing sides to the elongated mounting pin, it becomes possible by using only two refractory anchors to make an open or a closed hexagonal shape. Further, this arrangement makes it possible that by using three refractory anchors two open or closed hexagonal shapes can be made. Hence, the configuration of the refractor anchor enables hexagonal shapes by using relatively less refractory anchors. In this way, the number of refractory anchors to be installed, in particular the installation time for installing refractory anchors on relatively large surfaces, can be reduced drastically, whereas at the same time the inventors have found out that the refractory anchors provide excellent and long lasting results for anchoring lining material for protecting equipment against a high temperature and/or abrasive environment as a result of processes occurring inside vessels, conduits, cyclones and other installations. One of the main advantages is the strength of the refractory anchors obtained by two V-shaped anchor fin branches of at least one second anchor fin section, wherein two V-shaped anchor fin branches have substantially the same height seen in the longitudinal direction of the elongated mounting pin. The corresponding heights provide a refractory anchor having a relatively long durability for anchoring lining material for protecting equipment. In addition, the corresponding heights of the two V-shaped anchor fin branches contribute in improved anchoring results of the refractory anchors.

In one aspect, the height of each anchor fin branch of the least one second anchor fin section may correspond to or is larger than the height of the elongated mounting pin seen in the longitudinal direction. This relatively large height provides a relatively strong refractory anchor having improved liner anchoring results.

Further, the angle between the two V-shaped anchor fin branches of the at least one second anchor fin section may be relatively large, i.e. larger than 100 degrees and smaller than 160 degrees, preferably between 110 and 140 degrees, most preferred 120 degrees. Such a relatively large angle also contributes in improved anchoring results of the refractory anchors. At least one of the anchor fin branches may be provided with a tab for further improving anchoring results. The tab may extend with an acute angle with respect to the anchor fin branch.

In one further aspect, to obtain a refractory anchor having an uniform strength, the two V-shaped anchor fin branches of the at least one second anchor fin section may have substantially the same length and/or substantially the same thickness.

In a further aspect, a first portion of the first side of each first anchor fin section is connected to a second end section of the elongated mounting pin located adjacent to, or forming, the second end of the elongated mounting pin, wherein a second portion of the first side of each first anchor fin section is not connected to the elongated mounting pin, wherein between the second portions of the first sides of the first anchor fin sections a space is provided, wherein the space is located above the second end of the elongated mounting pin seen in the longitudinal direction of the elongated mounting pin. This space provides stronger refractory anchors in vessels/cyclones in that the refractory anchors with these spaces are able to withstand higher temperatures. After installing the refractory anchor and after applying a lining material over the refractory anchor, the lining material fills the space and after curing the space is filled with liner. This liner in the space provides a temperature buffer, because the liner conducts heat less well than the refractory anchor, in particular the elongated mounting pin of the refractory anchor. After installation the hot side of the refractory anchor is the side which is furthest away from the object to which the refractory anchor has been welded. By providing the space between the sides of the anchor fin portions facing each other, which space is filled with heat-insulating liner, there is no direct heat path between the hot side located above upper sides of the anchor fin portions and the second end of the elongated mounting pin. By burying the further second end of the elongated mounting pin with heat-insulating liner provided in the space of the submerged section, the temperatures in the elongated mounting pin, in particular towards the first end of the elongated mounting pin welded or weldable to an object, can be reduced drastically. Under certain high temperature conditions in the vessel/cyclone, a direct heat path may damage the weld between the refractory anchor and the object. In these high-temperature situation the submerged section extends the life-time of the refractory anchor, without requiring undesired short maintenance or inspecting intervals. Hence, by providing the liner temperature buffer in the submerged section there is no direct heat path between the hottest side of the refractory anchor and the first end of the elongated mounting pin welded to the object, which provides a longer lasting refractory anchor configured to be used in vessels/cyclones configured for relatively high-temperature processes.

In a different aspect, each second portion of the first sides of the first anchor fin sections has a cut-out. These cut outs provide improved anchoring results of the liner in the space between these first sides of the anchor fin portions facing each other and contribute in reducing a heat path from the hot side of the refractory anchor to the first end of the elongated mounting pin welded or to be welded to the object.

After installation of the refractory anchor, the lower corners of the anchor fins, i.e. the corners having a relatively small distance to the object seen in the longitudinal direction of the elongated mounting pin, are buried completely and relatively deep in the lining material, i.e. deeper than the upper corners which are approximately flush with the lining material. The lower corners are rounded, because rounded lower corners of the anchor fins reduce the risks of cracks in the (cured) liner compared to conventional straight corners drastically, because in use the refractory anchor may experience thermal expansion and/or vibrations and as a result the sharp corners like the straight corners are able to cut into the cured lining material which may provide cracks/bursts in the liner after a certain period of use.

Further, the elongated mounting pin may be advantageously made from a different material than the anchor fins and a connector to be discussed below if present. More specific, the elongated mounting pin is made from a first alloy and the anchor fins are made of a second alloy different from the first alloy. The first alloy is for example configured for optimal welding results of the elongated mounting pin to an object such as for example a backing plate. The anchor fins are made of a second alloy different from the first alloy, wherein the second alloy is configured for providing optimal anchoring results of the liner and/or for providing maximum protection against the high temperature and/or abrasive environment of processes occurring inside the vessel/cyclone. The elongated mounting pin is advantageously made of a material configured for stud welding the elongated mounting pin to an object, for example a metal plate. Hence, by using stud welding technique, the installation time of the refractory anchors is relatively fast, in particular compared to hand welding or spot welding.

In another aspect, the two anchor fins are connected to each other by a connector, wherein the connector is connected to the elongated mounting pin, wherein the connector and the anchor fin(s) are made in one piece and/or from one and the same material. Such a connector can be used to connect the anchor fin(s) in a fast manner to the elongated mounting pin and provides a strong, reliable and long lasting connection between the anchor fin(s) and the elongated mounting pin.

In a further aspect, the connector provides a through hole for receiving the elongated mounting pin for providing a connection between the elongated mounting pin and the connector. A relatively fast, simple, safe and operator-friendly technique is by providing the connection between the elongated mounting pin and the connector by friction fit, i.e. after positioning the elongated mounting pin into the through hole, a second end of the elongated mounting pin opposite to the end to be welded to the object is subjected to pressure such that a second end section directly located below the second end expands for fixing the second end section inside the through-hole of the connector. Such a connection can be provided in a relatively fast manner and has provided excellent long lasting results, in particular inside high temperature processing vessels/cyclones.

The anchor fins of the refractory anchor may be mirror symmetrical with respect to a plane through the center line of the elongated mounting pin and perpendicular to the virtual plane in which the two first anchor fin sections of the refractory anchor extend. Such a refractory anchor may mimic two half-hexagonal shapes, i.e. two half-hexagonal shapes formed by the first anchor sections together with the second anchor sections.

Each anchor fin may comprise two third anchor fin sections extending parallel to the first anchor fin section, preferably the two third anchor fin sections are provided without a tab. Such a refractory anchor may mimic four half-hexagonal shapes, i.e. two half-hexagonal shapes formed by the first anchor sections together with the second anchor sections and two other half-hexagonal shapes formed by second anchor sections together with the third anchor fin sections. In a different embodiment, only one of the two anchor fins is provided with a third anchor fin section extending parallel to the first anchor fin section. In this way, it is also possible to obtain three closed hexagonal shapes by using four refractory anchors. In this different embodiment of the refractory anchor, the third anchor fin section may be provided with a tab for improving anchoring results of the third anchor fin section, preferably the tab has an acute angle with the third anchor fin section.

As the dimensions of the refractory anchors comprising third anchor fin sections are relatively large, in particular the distance between the center line of the elongated mounting pin and an outer free side of a third anchor fin section, the third anchor fin section may have a so called raised tip design, such that seen from a virtual horizontal plane around the first end of the elongated mounting pin, the largest vertical spacing between the horizontal plane and the third anchor fin section is provided by the distance between a corner of the third anchor fin section and the horizontal plane, wherein the corner of the third anchor fin section is the corner between a side of the third anchor fin section facing the horizontal plane and an outer free side of the third anchor fin section. The vertical spacing between the horizontal plane and the side facing the horizontal plane may increase towards the corner of the third anchor fin section, for example gradually or with one or a number of slopes which may have different inclination angles. The raised tip design improves the flow of the lining material, i.e. refractory cement, between the anchor fins and the object to which the refractory anchor has been welded.

It is a further goal to provide an assembly comprising an object such as a metal plate and a refractory anchor. This goal is achieved with the claim directed to an assembly. The refractory anchor has been welded on the object, preferably by stud welding. By using at least two refractory anchors in the assembly an open or closed hexagonal shape may be made and/or by using three refractory anchors two open or closed hexagonal shapes may be made and/or by using four refractory anchors three closed hexagonal shapes are made.

It is also an object to provide a method for providing the above assembly. This object is achieved according to the claim directed to a method. The elongated mounting pin of the refractory anchor is connected to the object by stud welding, preferably drawn arc stud welding. Further, by using two refractory anchors an open or a closed hexagonal shape may be made on the object and/or by using three refractory anchors two open or closed hexagonal shapes may be made on the object and/or by using four refractory anchors three closed hexagonal shapes are made on the object.

BRIEF DESCRIPTION OF THE FIGURES

The present invention will be explained in more detail below with reference to the appended figures showing exemplary embodiments of a refractory anchor and exemplary embodiments of an assembly.

Like parts are indicated by the same reference signs in the various figures.

Each feature disclosed with reference to the figure can also be combined with another feature disclosed in this disclosure including the claims, unless it is evident for a person skilled in the art that these features are incompatible.

DETAILED DESCRIPTION

The two embodiments of the refractory anchor shown in the FIGS. 1-4 and FIGS. 5-8 have a corresponding basis as will be explained hereafter before explaining the differences between the two embodiments.

Figure 1:
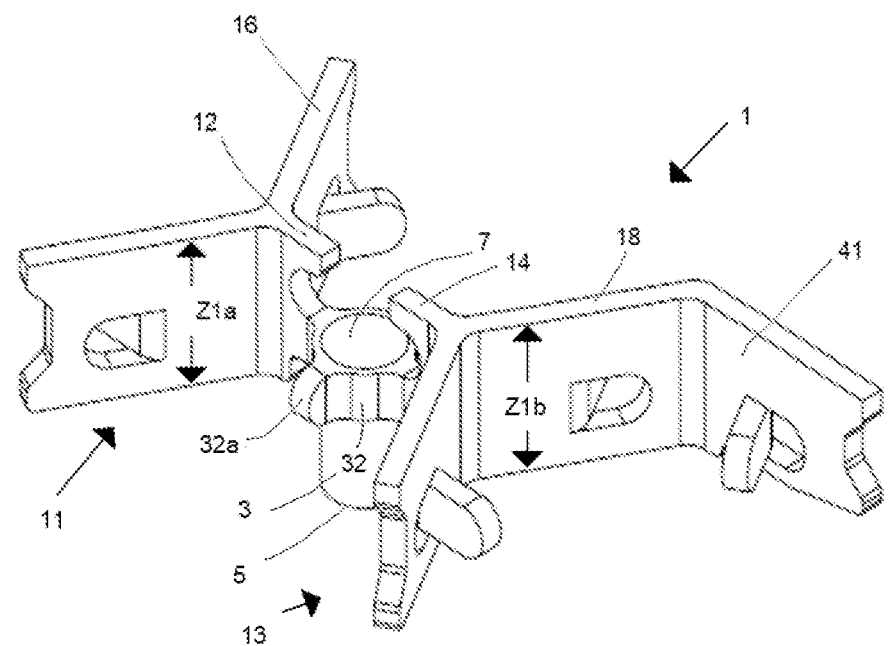
FIG. 1 shows a perspective view of a first embodiment of a refractory anchor.
Figure 2:
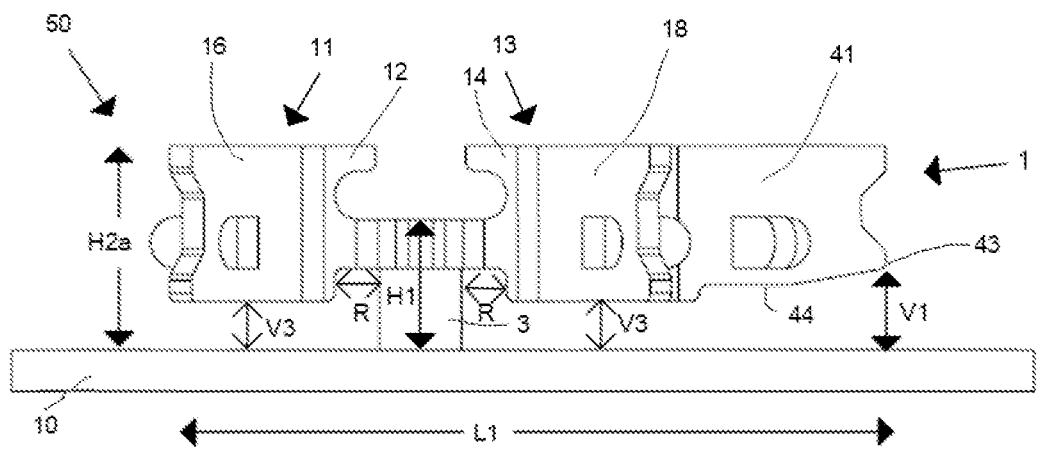
FIG. 2 shows a front view of a first embodiment of an assembly comprising the refractory anchor shown in FIG. 1.
Figure 6:
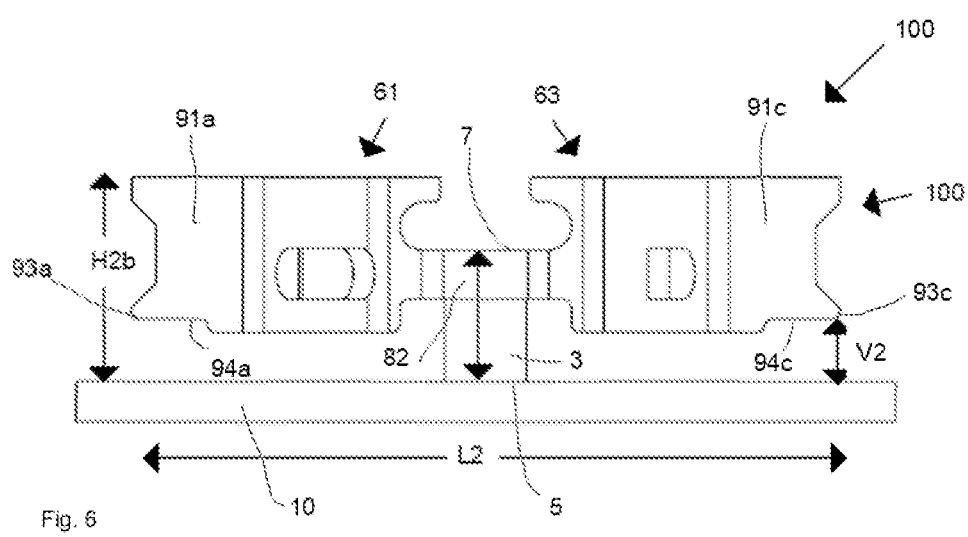
FIG. 6 shows a front view of a second embodiment of an assembly comprising the refractory anchor shown in FIG. 5.

FIGS. 1-8 show a refractory anchor 1; 51 comprising an elongated mounting pin 3 having a first end 5 and a second end 7 opposite to the first end 5 seen in the longitudinal direction of the elongated mounting pin 3, wherein the first end 5 of the elongated mounting pin 3 is weldable to an object 10 (see FIGS. 2 and 6).

The refractory anchor 1; 51 further comprises two anchor fins 11, 13; 61; 63 of which each has a first anchor fin section 12, 14; 62, 64 having a first side 12', 14'; 62', 64' and an opposing second side 12", 14"; 62", 64" located at a distance of the elongated mounting pin 3 with respect to the first side 12', 14'; 62', 64', wherein the first side 12', 14'; 62', 64' is connected to the elongated mounting pin 3 by means of a connector 32; 82. Details of the connector 32; 82 will be discussed below. As can be clearly seen in FIGS. 4 and 8, the two first anchor fin sections 12, 14; 62, 64 are located in one virtual plane. Each anchor fin 11, 13; 61; 63 comprises a second anchor fin section 16, 18; 66, 68 which is connected to the second side 12", 14"; 62", 64" of each first anchor fin section 12, 14; 62, 64. Seen from above the refractory anchor 1; 51, see FIGS. 4 and 8, each second anchor fin section 16, 18; 66, 68 branches off in a V-shaped manner from each first anchor fin section 12, 14; 62, 64, wherein two V-shaped anchor fin branches 20, 21, 22, 23; 70, 71, 72, 73; of each second anchor fin section 16, 18; 66, 68 have substantially the same height Z1a, Z1b; Z2a, Z2b seen in the longitudinal direction of the elongated mounting pin 3. The height Z1a, Z1b; Z2a, Z2b of each anchor fin branch 20, 21, 22, 23; 70, 71, 72, 73 corresponds to or is larger, for example maximally 10% larger, than the height H1 (FIGS. 2 and 4) of the elongated mounting pin 3 seen in the longitudinal direction after installation on the object 10. The angle α (FIGS. 4 and 8) between the two V-shaped anchor fin branches 20, 21, 22, 23; 70, 71, 72, 73 is approximately 120 degrees.

Figure 3:
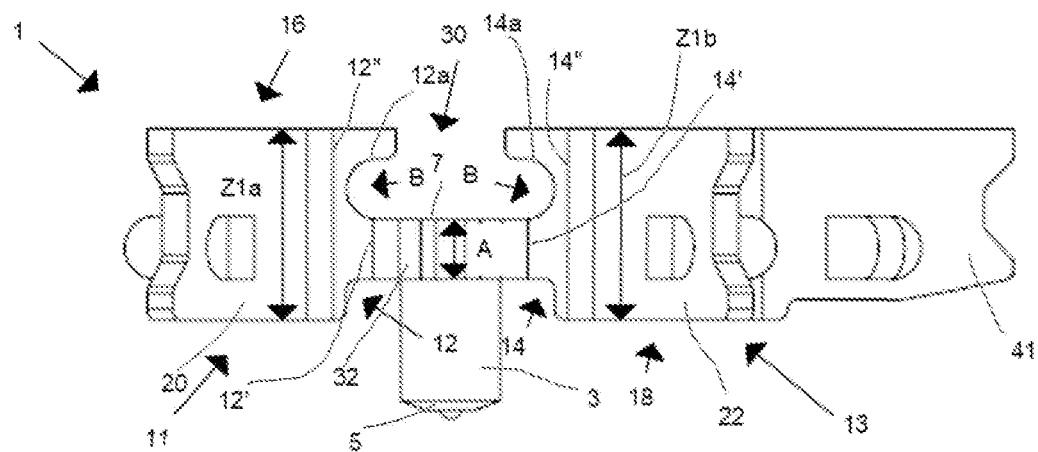
FIG. 3 shows a front view of the refractory anchor shown in FIG. 1.
Figure 7:
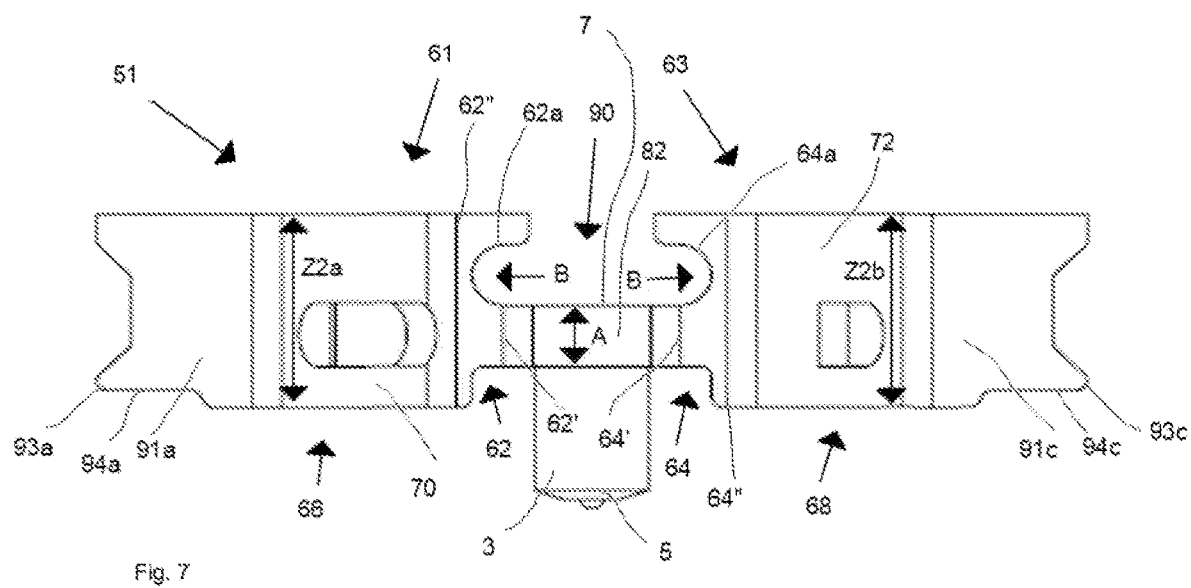
FIG. 7 shows a front view of the refractory anchor shown in FIG. 5.
Figure 8:
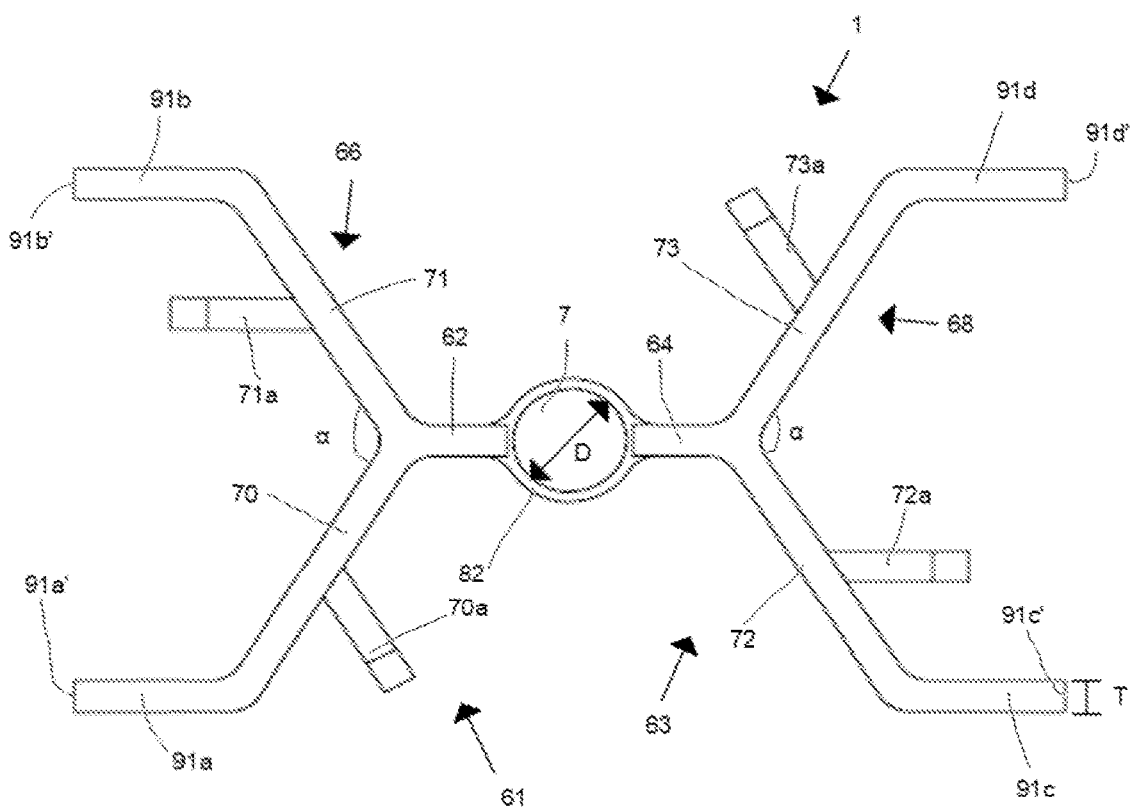
FIG. 8 shows a top view of the refractory anchor shown in FIGS. 5 and 7.

A first portion of the first side 12', 14'; 62', 64' of each first anchor fin section 12, 14; 62, 64 is connected by the connector 32; 82 to a second end section which is indicated in FIGS. 3 and 7 by arrow A of the elongated mounting pin 3 located adjacent to the second end 7 of the elongated mounting pin 3. The connector 32; 82 comprises a through hole for receiving the second end section A of the elongated mounting pin 3 for providing a connection between the elongated mounting pin 3 and the connector 32; 82. A relatively fast, simple, safe and operator-friendly technique is by providing the connection between the elongated mounting pin 3 and the connector 32; 82 by friction fit, i.e. after positioning the elongated mounting pin 3 into the through hole, the second end 7 of the elongated mounting pin 3 is subjected to pressure such that a second end section A directly located below the second end 7 expands for fixing the second end section A inside the through-hole of the connector 32; 82. Such a connection can be provided in a relatively fast manner and has provided excellent long lasting results, in particular inside high temperature processing vessels/cyclones.

A second portion of the first side 12', 14'; 62', 64' of each first anchor fin section 12, 14; 62, 64, indicated by arrow B in FIGS. 3 and 7, is not connected to the connector 12, wherein between the second portions B of the first sides 12', 14'; 62', 64' of the first anchor fin sections 12, 14; 62, 64 a space 30; 90 is provided, wherein the space 30; 90 is located above the second end 7 of the elongated mounting pin 3 seen in the longitudinal direction of the elongated mounting pin 3. This space 30; 90 provides stronger refractory anchors in vessels/cyclones in that the refractory anchors provided with these spaces 30; 90 are able to withstand higher temperatures. After installing the refractory anchor 1; 51 and after applying a lining material over the refractory anchor 1; 51, the lining material fills the space 30; 90 and after curing the space 30; 90 is filled with liner. This liner in the space 30; 90 provides in an advantageous manner a temperature buffer as mentioned in the description above. Each second portion B of the first sides 12', 14'; 62', 64' of the first anchor fin sections 12, 14; 62, 64 has a cut-out 12a, 14a; 62a, 64a (FIGS. 3 and 7) for improving the anchoring results of the liner in the space 30; 90. A third portion of the first side 12', 14'; 62', 64' of each first anchor fin section 12, 14; 62, 64, i.e. the first portion is located between the second and third portion of the first side 12', 14'; 62', 64' of each first anchor fin section 12, 14; 62, 64, is also not connected to the connector 12, and there is a distance indicated by arrow R (FIG. 2) between the third portion of each anchor fin 11, 13; 61, 63 facing each other and the elongated mounting pin 3.

This distance R improves the flow of the liquid lining material and reduces after installation a direct or relatively short heat path between upper sides of the anchor fins 11, 13; 61, 63 and the end 5 of the elongated mounting pin 3 weldable or welded to object 10, such that a refractory anchor can be provided with an improved configuration to withstand high temperatures on the "hot side" of the refractory anchor 1; 51. After installation, the upper sides of the refractory anchor 1; 51 are facing the "hot side".

The elongated mounting pin 7 is advantageously made from a different material than the anchor fins 11, 13; 61, 63 and the connector 32; 82. More specific, the elongated mounting pin 7 is made from a first alloy and the anchor fins 11, 13; 61, 63 and the connector 32; 82 are made of a second alloy different from the first alloy. The first alloy is for example configured for optimal welding results of the elongated mounting pin 3 to an object 10 such as for example a backing plate. The anchor fins 11, 13; 61, 63 and the connector 32; 82 are made of a second alloy different from the first alloy, wherein the second alloy is configured for providing optimal anchoring results of the liner and/or for providing maximum protection against the high temperature and/or abrasive environment of processes occurring inside the vessel/cyclone. The elongated mounting pin 7 is advantageously made of a material configured for stud welding the elongated mounting pin to the object 10, such that the refractory anchor 1; 51 can be stud welded, preferably drawn arc stud welded, to the object 10.

Each anchor fin branch 20, 21, 22, 23; 70, 71, 72, 73 is provided with at least one tab 20a, 21a, 22a, 23a; 70a, 71a, 72a, 73a (FIGS. 4 and 8) to further improve the anchoring effect of the refractory anchor 1; 51. Each tab 20a, 21a, 22a, 23a; 70a, 71a, 72a, 73a has an acute angle with the anchor fin branch 20, 21, 22, 23; 70, 71, 72, 73, for example between 50-70 degrees. The tabs 20a, 21a, 22a, 23a; 70a, 71a, 72a, 73a are provided in the anchor fin branches 20, 21, 22, 23; 70, 71, 72, 73 in such a manner that the tabs 20a, 21a, 22a, 23a; 70a, 71a, 72a, 73a have the acute angle with the anchor fin branch 20, 21, 22, 23; 70, 71, 72, 73, wherein in the anchor fin branch a through hole is provided. This through hole may have the same shape as the tab as shown in the figures, i.e. each tab and each associated through hole have a U-shape. This through hole is positioned in the anchor fin branches 20, 21, 22, 23; 70, 71, 72, 73 between the side of the anchor fin branches 20, 21, 22, 23; 70, 71, 72, 73 connected to the first anchor fin section 12, 14; 62', 64' and a free end side of the anchor fin branches 20, 21, 22 or a side of the anchor fin branches 23; 70, 71, 72, 73 connected to a third anchor fin section 41; 91a-d.

The refractory anchor 1; 51 only comprises two anchor fins 11, 13; 61, 63, wherein the two Y-shapes (FIGS. 4 and 8) on opposing sides to the elongated mounting pin 3 of the refractory anchor 1; 51 mimic two half-hexagonal shapes. These two half-hexagonal shapes provide a refractory anchor with long lasting and excellent liner anchoring results, such that it becomes possible by using only two refractory anchors to make a closed hexagonal shape in a manner comparable with the (template) pattern as shown in FIG. 6 of US2016/00471224, but with the difference that by means of the refractory anchor 1; 51 disclosed in this document, less refractory anchors are required for providing a closed hexagonal shape.

In addition, each refractory anchor 1; 51 comprises at least one third anchor fin section 41; 91a-d extending parallel to the first anchor fin section 12, 14; 62, 64. By means of the third anchor fin sections 41; 91a-d, it is possible by using four refractory anchors 1; 51 to make three closed hexagonal shapes.

Figure 4:
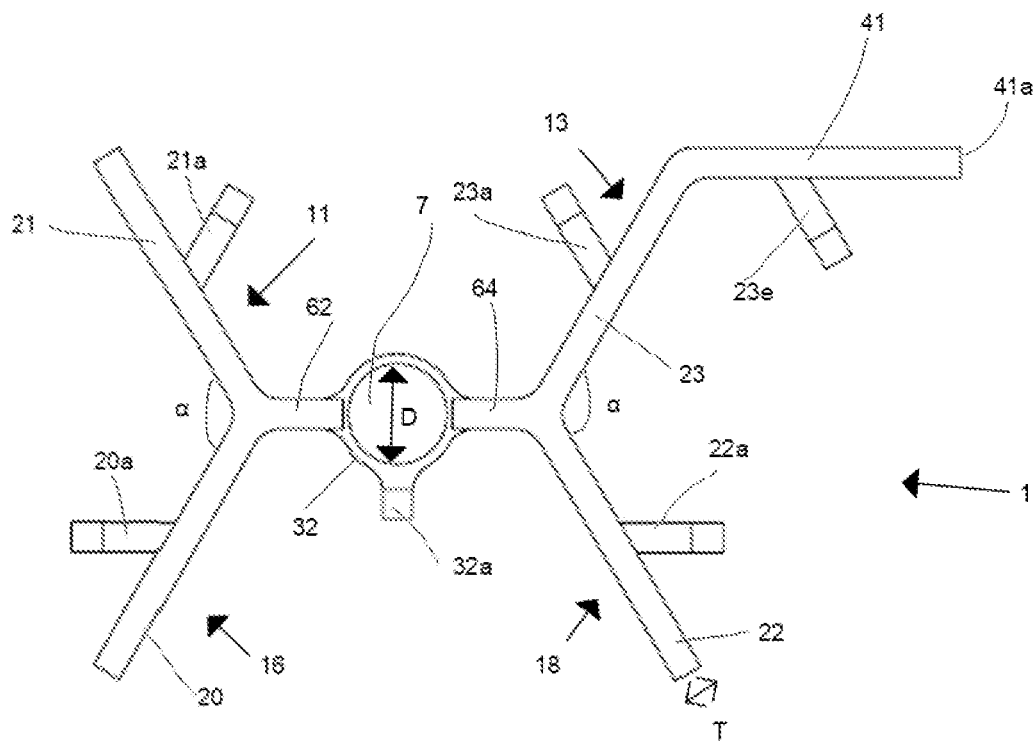
FIG. 4 shows a top view of the refractory anchor shown in FIGS. 1 and 3.
Figure 5:
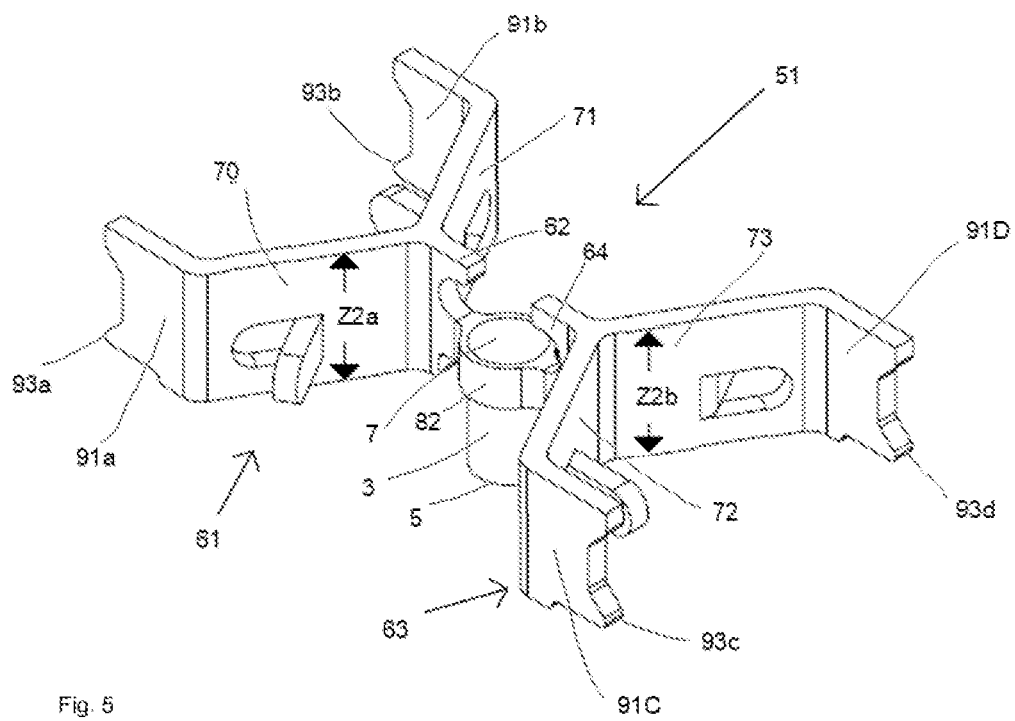
FIG. 5 shows a perspective view of a second embodiment of a refractory anchor.

As the dimensions of the refractory anchors 1; 51 comprising the third anchor fin sections 41; 91a-d are relatively large, in particular the distance between the center line of the elongated mounting pin 3 and an outer free side 41a, 91a'-d' of a third anchor fin section 41; 91a-d, the third anchor fin section 41; 91a-d may have a so called raised tip design, such that seen from a virtual horizontal plane (for example the object 10 in FIGS. 2 and 6) around the first end 5 of the elongated mounting pin 3, the largest vertical spacing V1; V2 between the horizontal plane 10 and the third anchor fin section 41; 91a-d is provided by the distance between the horizontal plane 10 and a corner 43; 93a-d of the third anchor fin section 41; 91a-d, wherein the corner 43; 93a-d of the third anchor fin section 41; 91a-d is the corner between a side 44, 94a-d of the third anchor fin section 41; 91a-d facing the horizontal plane 10 and an outer free side 41a, 91a'-d' of the third anchor fin section 41; 91a-d. The vertical spacing between the horizontal plane 10 and the side 44, 94a-d of the third anchor fin section 41; 91a-d facing the horizontal plane 10 may increase towards the corner 43; 93a-d of the third anchor fin section 41; 91a-d, for example by only one slope like in the sides 94a-d (FIG. 6) or with a number of slopes having different inclination angles like in the side 44 (FIG. 2). The raised tip design improves the flow of the lining material, i.e. refractory cement, between the anchor fins 11, 13; 61, 63 and the object 10 to which the refractory anchor 1; 51 has been welded. Further, it is noted that the anchor fins 11, 13; 61, 63 also have a minimal horizontal spacing V3 as shown in FIG. 2 between the a virtual horizontal plane (for example the object 10 in FIGS. 2 and 6) around the first end 5 of the elongated mounting pin 3 and the underside of the second anchor fin section 16, 18; 66, 68 which is smaller than spacing V1/V2. In the refractory anchor 1, 51 the mounting pin 3 is arranged with respect to the anchor fins 11, 13; 61, 63 to provide this minimal vertical height/spacing V3. This minimal vertical height/spacing V3 of the refractory anchor 1, 51 is important during installation of an assembly 50; 100 as shown in FIGS. 4 and 6 to guarantee that lining material in liquid form is free to flow under the anchor fins 11, 13; 61, 63 to obtain excellent lining results. This flow is further improved in the refractory anchor 1, 51 by the raised tip design as mentioned above. Further, the upper side of third anchor fin section 41; 91a-d, i.e. the side opposite to the side 44, 94a-d of the third anchor fin section 41; 91a-d facing the horizontal plane 10, is flush with the upper side of the anchor fin branch 20, 21, 22, 23; 70, 71, 72, 73 and flush with the upper side of the first anchor fin section 12, 14; 62, 64.

The outer free side 41a, 91a'-d' of a third anchor fin section 41; 91a-d has a smaller height than the height Z1a, Z1b; Z2a, Z2b of the second anchor fin sections 16, 18; 66, 68. Further, between the corners (including corner 43; 93a-d) of the outer free side 41a, 91a'-d' of the third anchor fin section 41; 91a-d, the outer free side 41a, 91a'-d' of the third anchor fin section 41; 91a-d is provided with a cut-out. These cut outs prevent or reduce heat transfer between two adjacent positioned refractory anchors 1; 51. Further, this cut-out may facilitate providing improved anchoring results of the liner.

After installation of the refractory anchor 1, 51 such that the assembly 50; 100 (FIGS. 2 and 6) is provided, the lower corners of the anchor fins 11, 13; 61, 63, i.e. the corners having a relatively small distance to the object 10 seen in the longitudinal direction of the elongated mounting pin 3, are buried completely and relatively deep in the lining material, i.e. deeper than the upper corners which are approximately flush with the lining material after installation. The lower corners such as corner 43; 93*a-d*, are rounded, because rounded lower corners of the anchor fins reduce the risks of cracks in the (cured) liner compared to conventional straight corners drastically, because in use the refractory anchor 1; 51 may experience vibrations and as a result of these vibrations sharp corners like the straight corners are able to cut into the cured lining material which may provide cracks/bursts in the liner after a certain period of use.

The main difference between the refractory anchors 1; 51 is that the refractory anchor 1 comprises only one third anchor fin section 41, whereas in the refractory anchor 51 each second anchor fin section 66, 68 comprises a third anchor fin section 91*a-d*, such that the refractory anchor 51 comprises four third anchor fin sections 91*a-d*. The anchor fins 61, 63 of the refractory anchor 51 are mirror symmetrical with respect to a plane through the center line of the elongated mounting pin 3 and perpendicular to the virtual plane in which the two first anchor fin sections 62, 64 of the refractory anchor extend. In the embodiment of the refractory anchor 51 shown in the figures, the tabs 70*a*, 71*a*, 72*a*, 73*a* of the refractory anchor 51 have an asymmetrical configuration with respect to each other, although a symmetrical configuration (not shown) is also be possible. By means of this configuration of the refractory anchor 51, including the four third anchor fin section 91*a-d*, it is possible by using five refractory anchors 51 to make four closed hexagonal shapes. In the refractory anchor 1 the only third anchor fin section 41 is connected to the anchor fin branch 23 of second anchor fin 18 of the anchor fin 13, whereas anchor fin 11 does not have a third anchor fin section.

A further difference is that the third anchor fin section 41 of the refractory anchor 1 comprises a tab 23*e* having an acute angle with the third anchor fin section 41, for example between 50-70 degrees, whereas the third anchor fin sections 91*a-d* of the refractory anchor 51 are provided without a tab. In addition, the tabs 20*a*, 21*a*, 22*a*, 23*a*; 70*a*, 71*a*, 72*a*, 73*a* provided in the anchor fin branch 20, 21, 22, 23; 70, 71, 72, 73 may have a different configuration in at least one anchor fin 11; 61 as for example shown in the FIGS. 4 and 6.

The connectors 32; 82 also have a different configuration, in that the connector 32 is provided with a tab-like projection 32*a* extending perpendicular to the virtual plane in which the two first anchor fin sections 12, 14 of the refractory anchor 1 extend.

The longest dimension L1 (FIG. 2) of the refractory anchor 1 is smaller than 30 cm for example approximately 10 cm. The longest dimension L2 (FIG. 6) of the refractory anchor 51 is also smaller than 30 cm for example approximately 9 cm. L2 is smaller than L1, because the third anchor fin sections 91*a-d* of the refractory anchor 51 have a smaller length in the direction indicated by arrow L2 than the third anchor fin section 41 of the refractory anchor 1. Each anchor fin 11, 13 may have a thickness indicated by arrow T (FIGS. 4 and 8) smaller than 1 cm, for example approximately 3 mm. The height indicated by arrow H2$a$, H2$b$ (FIGS. 2 and 6) of the refractory anchor 1; 51 measured from the object 10 is smaller than 7.5 cm, for example 2.5 cm, wherein the height Z1$a$, Z1$b$; Z2$a$, Z2$b$ of the second anchor fin sections 16, 18; 66, 68 is approximately 2.0 cm. The elongated mounting pin 3 and the anchor fins are configured such that the spacing (height/distance) V1, V2 between the third anchor fin sections 41, 91*a-d* and the object 10 to which the refractory anchor 1 is welded or is weldable is at least 20% of the total height H2$a$, H2$b$ of the refractory anchor 1; 51. The spacing (height/distance) V3 between the underside of the second anchor fin section 16, 18; 66, 68 and the object 10 to which the refractory anchor 1; 51 is welded or is weldable is 10-20% of the total height H2$a$, H2$b$ of the refractory anchor 1; 51. This height/distance V1, V2 improves the flow capacity of the lining material such that the quality of the cured liner can be improved, in that cavities in the lining material to be cured can be prevented or at least be reduced during installation of the refractory lining material.

As shown in the drawings the elongated mounting 3 has a cylindrical shape. However, different shaped pins having corners for forming a pin having a polygonal cross-section can also be used, for example a plate shaped pin. The diameter indicated by arrow D (FIGS. 4 and 8) of the elongated mounting 3 is smaller than 2.5 cm, for example 1 cm.

The invention claimed is:

1. A refractory anchor comprising an elongated mounting pin having a first end and a second end opposite to the first end in a longitudinal direction of the elongated mounting pin, wherein the first end of the elongated mounting pin is weldable to an object, the refractory anchor further comprises two anchor fins of which each has a first anchor fin section having a first side and an opposing second side located at a distance of the elongated mounting pin with respect to the first side, wherein the first side is connected to the elongated mounting pin, wherein in that the two first anchor fin sections are located in one virtual plane, and a first side of a second anchor fin section is connected to the second side of each of the first anchor fin sections, wherein from above the refractory anchor, each of the second anchor fin sections branches off in a V-shaped manner from each of the first anchor fin sections, wherein two V-shaped anchor fin branches of at least one of the second anchor fin sections have substantially a same height in the longitudinal direction of the elongated mounting pin, wherein each of the two anchor fins comprises, at a second side of the second anchor fin section opposed to the first side, two third anchor fin sections extending parallel to the first anchor fin section and wherein from a virtual horizontal plane at the first end of the elongated mounting pin, a largest vertical spacing between the virtual horizontal plane and the third anchor fin section is provided by a distance between the virtual horizontal plane and a peripheral corner of the third anchor fin section, wherein the peripheral corner of the third anchor fin section is a corner between a bottom surface of a side of the third anchor fin section facing the virtual horizontal plane and an outer free peripheral side of the third anchor fin section, wherein the bottom surface starts from the second side of the second anchor fin section and ends at the peripheral corner, wherein the vertical spacing between the virtual horizontal plane and the bottom surface increases towards the peripheral corner of the third anchor fin section.

2. The refractory anchor according to claim 1, wherein a height of each of the two V-shaped anchor fin branches of at least one of the second anchor fin sections corresponds to or is larger than a height of the elongated mounting pin.

3. The refractory anchor according to claim 1, wherein an angle between the two V-shaped anchor fin branches of the at least one second anchor fin section is larger than 100 degrees and smaller than 160 degrees.

4. The refractory anchor according to claim 1, wherein the two V-shaped anchor fin branches of the at least one second anchor fin section have substantially a same length and/or substantially a same thickness.

5. The refractory anchor according to claim 1, wherein a first portion of the first side of each of the first anchor fin sections is connected to a section of the second end of the elongated mounting pin located adjacent to, or forming, the second end of the elongated mounting pin, wherein a second portion of the first side of each of the first anchor fin sections is not connected to the elongated mounting pin, wherein between the second portions of the first sides of the first anchor fin sections a space is provided, wherein the space is located above the second end of the elongated mounting pin in the longitudinal direction of the elongated mounting pin.

6. The refractory anchor according to claim 5, wherein each of the second portions of the first sides of the first anchor fin sections has a cut-out.

7. The refractory anchor according to claim 1, wherein lower corners of the two anchor fins are rounded.

8. The refractory anchor according to claim 1, wherein at least one of the two V-shaped anchor fin branches are provided with a tab.

9. The refractory anchor according to claim 1, wherein the elongated mounting pin is made from a different material than the two anchor fins.

10. The refractory anchor according to claim 9, wherein the elongated mounting pin is made from a first alloy and the two anchor fins are made of a second alloy different from the first alloy.

11. The refractory anchor according to claim 1, wherein the elongated mounting pin is made of a material configured for stud welding the elongated mounting pin to an object.

12. The refractory anchor according to claim 1, wherein the two anchor fins are connected to each other by a connector, wherein the connector is connected to the elongated mounting pin, wherein the connector and the two anchor fins are made in one piece, and/or the connector and the two anchor fins are made from a same material.

13. The refractory anchor according to claim 12, wherein the connector provides a through hole for receiving the elongated mounting pin for providing a connection between the elongated mounting pin and the connector, wherein the connection between the elongated mounting pin and the connector is provided by a friction fit.

14. The refractory anchor according to claim 1, wherein the two anchor fins of the refractory anchor are mirror symmetrical with respect to a plane through a center line of the elongated mounting pin and perpendicular to the virtual plane in which the two first anchor fin sections of the refractory anchor extend.

15. The refractory anchor according to claim 1 wherein the vertical spacing between the virtual horizontal plane and the side facing the virtual horizontal plane increases towards the peripheral corner of the third anchor fin section.

16. The refractory anchor according to claim 1, wherein the third anchor fin section is provided with a tab.

17. An assembly of an object and a refractory anchor according to claim 1, wherein the refractory anchor is welded on the object.

18. The assembly according to claim 17, wherein by using two refractory anchors a closed hexagonal shape is made and/or by using three refractory anchors two closed hexagonal shapes are made and/or by using four refractory anchors three closed hexagonal shapes are made.

19. A method for providing an assembly according to claim 17, wherein the elongated mounting pin of the refractory anchor is connected to the object by stud welding.

20. The method according to claim 19, wherein by using two refractory anchors a closed hexagonal shape is made on the object and/or by using three refractory anchors two closed hexagonal shapes are made on the object and/or by using four refractory anchors three closed hexagonal shapes are made on the object.

21. A refractory anchor comprising an elongated mounting pin having a first end and a second end opposite to the first end in a longitudinal direction of the elongated mounting pin, wherein the first end of the elongated mounting pin is weldable to an object, the refractory anchor further comprises two anchor fins of which each has a first anchor fin section having a first side and an opposing second side located at a distance of the elongated mounting pin with respect to the first side, wherein the first side is connected to the elongated mounting pin, wherein in that the two first anchor fin sections are located in one virtual plane, and a first side of a second anchor fin section is connected to the second side of each of the first anchor fin sections, wherein from above the refractory anchor, each of the second anchor fin sections branches off in a V-shaped manner from each of the first anchor fin sections, wherein two V-shaped anchor fin branches of at least one of the second anchor fin sections have substantially a same height in the longitudinal direction of the elongated mounting pin, wherein only one of the two anchor fins is provided at a second side of the second anchor fin section opposed to the first side with a third anchor fin section extending parallel to the first anchor fin section.

22. The refractory anchor of claim 21, wherein from a virtual horizontal plane at the first end of the elongated mounting pin, a largest vertical spacing between the virtual horizontal plane and the third anchor fin section is provided by a distance between the virtual horizontal plane and a peripheral corner of the third anchor fin section, wherein the peripheral corner of the third anchor fin section is a corner between a bottom surface of a side of the third anchor fin section facing the virtual horizontal plane and an outer free peripheral side of the third anchor fin section, wherein the bottom surface starts from the second side of the second anchor fin section and ends at the peripheral corner, wherein the vertical spacing between the virtual horizontal plane and the bottom surface increases towards the peripheral corner of the third anchor fin section.

* * * * *